United States Patent [19]
Ward et al.

[11] Patent Number: 5,564,741
[45] Date of Patent: Oct. 15, 1996

[54] AIR BAG FILTER AND SEAL ARRANGEMENT

[75] Inventors: Alan J. Ward, North Ogden; Guy R. Letendre, Ogden; Harry M. Miller, Ogden; David W. Lindsey, Ogden; Brent K. Olson, Clearfield; Michael P. Jordan, South Weber, all of Utah

[73] Assignee: Morton International, Inc., Chicago, Ill.

[21] Appl. No.: 489,467

[22] Filed: Jun. 12, 1995

[51] Int. Cl.⁶ .................................................. B60R 21/28
[52] U.S. Cl. ........................................... 280/740; 280/741
[58] Field of Search ................................. 280/740, 741, 280/736, 742

[56] References Cited

U.S. PATENT DOCUMENTS

| | | | |
|---|---|---|---|
| 3,785,674 | 1/1974 | Poole et al. | 280/741 |
| 3,791,302 | 2/1974 | McLeodd | 102/70.2 |
| 3,797,854 | 3/1974 | Poole et al. | 280/741 |
| 3,972,545 | 8/1976 | Kirchoff et al. | 280/735 |
| 4,116,466 | 9/1978 | Gehrig | 280/736 |
| 4,136,894 | 1/1979 | Ono et al. | 280/729 |
| 5,087,070 | 2/1992 | O'Loughlin et al. | 280/740 |
| 5,139,280 | 8/1992 | Cord et al. | 280/741 |
| 5,152,550 | 10/1992 | Hoagland et al. | 280/737 |
| 5,184,846 | 2/1993 | Goetz | 280/736 |
| 5,215,721 | 6/1993 | Tasaki et al. | 280/740 |
| 5,224,734 | 7/1993 | Swiderski et al. | 280/741 |
| 5,466,420 | 11/1995 | Parker et al. | 280/740 |

FOREIGN PATENT DOCUMENTS 2364268  6/1975  Germany.

*Primary Examiner*—Kenneth R. Rice
*Attorney, Agent, or Firm*—Taylor J. Ross; Gerald K. White

[57] ABSTRACT

A filter, seal and port arrangement for a pyrotechnic air bag inflator. The seal consists of a ring or annulus of sheet metal which has a foot section abutting against the filter, and a leg section of the seal angled to form an interference fit against an interior wall of the generator housing. For annular filters used in axial flow inflators, a ring is used at the radially inner and outer edges of the annular filter. For tubular filters used in radial flow inflators, a single seal at a longitudinal end may be sufficient. With such tubular filters, the seal may include a stand-off to form an annular void between the radially outer face of the filter and the wall of the housing. This void will act as a plenum to ensure that a greater volume of the filter is used. The tubular filter itself may also be formed with raised lands such that the interposed grooves form such a plenum. In a similar manner the disk filters may also have plenum producing lands on their outer faces, or the housing may include such lands. The housing may also be provided with tangentially oriented ports between the ignitor and the gas generating material to increase the contact area between the combusting ignitor and the generant, and to reduce the impingement force produced by the combusting ignitor.

36 Claims, 3 Drawing Sheets

AIR BAG FILTER AND SEAL ARRANGEMENT

BACKGROUND OF THE INVENTION

1. Field of the Invention

The present invention relates in general to air bag passive restraint systems. In particular, the present invention relates to improved seals for a gas filter within, improved filter structures for, and an improved port arrangement for, a pyrotechnic air bag inflator.

2. Description of the Related Art

Air bag systems typically include a housing which contains a pyrotechnic igniting charge and a pyrotechnic gas generating material, each in a separate section or chamber. The housing includes numerous internal ports for combustion gasses of the igniting charge to contact the gas generating material, causing a reaction to produce a larger quantity of inflation gas. The housing also includes numerous exit ports for allowing the generated inflation gas to pass into an inflatable cushion. Because the gas generating material produces high temperature gas containing high temperature particulates, it is common to filter the gas before it passes through the housing ports.

For driver side air bags, the air bag housing is typically located in the steering wheel, and is typically formed as a short cylinder, with the longitudinal axis of the cylinder being parallel to the rotation axis of the steering wheel. Centrally located within this cylinder is the igniting charge and an initiator or squib. Circumferentially surrounding (and possibly underlying or overlying) the initiating charge is the mass of pyrotechnic gas generating material. Such material is typically granulated or pelletized in nature, and may have various chemical compositions (e.g., azide).

With this basic design there are two common locations for the exit ports: axial or radial. For axial designs, the ports are located on the upper longitudinal end of the cylinder, and the filter medium is a disk or annulus located just below the ports. The gas generating medium is thus held as a short but relatively thick tube. For radial designs, the ports are located on the circumferential face of the cylinder, and the filter medium is a short tube located radially inward of the ports. In this arrangement the gas generating material is held in a taller and thinner tube configuration.

For both port arrangements it is desired first that the gas generating material be capable of quickly generating the gas. For this purpose the axial design has inherent advantages. Specifically, the combustion products from the ignitor will jet radially from the interior ports to contact the gas generating material. It can be envisioned that these radial jets would impact more upon a short thick tube than a tall thin tube of gas generant. This is because the short tube has more material in the radial direction in the jet path, and less material at the longitudinal ends, out of the jet path. As such, it is more difficult to achieve the proper gas generation with radial designs.

A second desire in air bag design is that the gas pass through the filter medium to cool the gas, reduce its velocity, and to remove particulates. This is best achieved when the gas passes evenly through the entire volume of the filter. This even flow is difficult to achieve, however.

One obstacle to even flow is the placement of the filter against the upper (for axial) or outer (fore radial) wall of the housing for support against the expansive pressure. These outer walls of course include the discrete spaced exit ports. The flow through the filter is thus greater in the areas over the ports than in the areas over the space between the ports, as the pressure differential across the filter is much greater over the ports than over the solid wall.

A further obstacle to even flow from one filter face to the other is that the gas may find a path of less resistance. For example, the gas may pass into an edges of the filter (i.e., the circumferential edge of the disk or annulus, and the longitudinal ends of the tube) and out the rear face, since this path can provide reduced resistance. At the most extreme, the gas may simply pass around the ends of the filter entirely. To avoid both situations, the filter is often sealed within the housing.

Specifically, the disk filter is compressed against the upper longitudinal end by the presence of the gas generant, or a tubular prefilter. For tubular filters, the height of the filter is set slightly larger than the interior height of the housing, forcing the filter ends against the housing interior. These arrangements of course require that the respective sizes of the housing interior, filter and generant volume be tightly controlled to ensure that the filter is placed in the proper amount of compression. Furthermore, these tolerances must be even tighter when the filter is not of the typical screens and papers, but is instead formed of a single rigid mass. To reduce the need for very close tolerances, the prior art has often used a separate, resilient cushion/seal component.

Finally, in prior art arrangements which use such separate seals, the material forming the seal must be chosen carefully. The material must provide a sufficient seal, of course. However, the material must also withstand the high temperatures and pressure achieved during gas generation. Additionally, the sealed nature of the housing requires that the seal material be subject to very little outgassing.

SUMMARY OF THE INVENTION

An object of the present invention is to provide an air bag gas filter arrangement which is reliably sealed.

Another object of the present invention is to provide such seal arrangement which is inexpensive, simple to install, and which does not outgas.

A further object of the present invention is to provide such a seal which may be used with convention filter packs having mesh and paper layers, and with rigid monolithic filters.

Yet another object of the invention is to provide such a seal which may take various forms to be used in either axial or radial flow housings.

Another object of the present invention is to provide an air bag gas filter arrangement in which the generated gas passes uniformly through the filter.

A further object of the present invention is such a filter arrangement in which a plenum is formed between the filter and exit ports.

Another object of the present invention is to provide such a plenum without the need for additional parts or assembly steps.

Yet a further object of the present invention is to provide a filter seal which may form a plenum for improved gas mixing and flow through the filter.

Yet another object of the present invention is to provide such a plenum by forming raised lands on one or both of the filter or housing.

Another object of the present invention is to provide a pyrotechnic air bag inflator which causes increased contact between the igniting jets and the gas generating material.

A further object of the present invention is to provide such a inflator which reduces the forces impinging upon the housing and filter.

Yet another object of the present invention is to provide tangential ports leading from the ignitor to the gas generant to provide this increase in contact and reduction in impinging forces.

These and other objects are achieved by a filter, seal and port arrangement for a pyrotechnic air bag inflator. The seal consists of a ring or annulus of sheet metal which has a foot section abutting against the filter, and a leg section of the seal angled to form an interference fit against an interior wall of the generator housing. For annular filters used in axial flow inflators, a ring is used at the radially inner and outer edges of the annular filter. For tubular filters used in radial flow inflators, a single seal at a longitudinal end may be sufficient. With such tubular filters, the seal may include a stand-off to form an annular void between the radially outer face of the filter and the wall of the housing. This void will act as a plenum to ensure that a greater volume of the filter is used. The tubular filter itself may also be formed with raised lands such that the interposed grooves form such a plenum. In a similar manner the disk filters may also have plenum producing lands on their outer faces, or the housing may include such lands. The housing may also be provided with tangentially oriented ports between the ignitor and the gas generating material to increase the contact area between the combusting ignitor and the generant, and to reduce the impingement force produced by the combusting ignitor.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
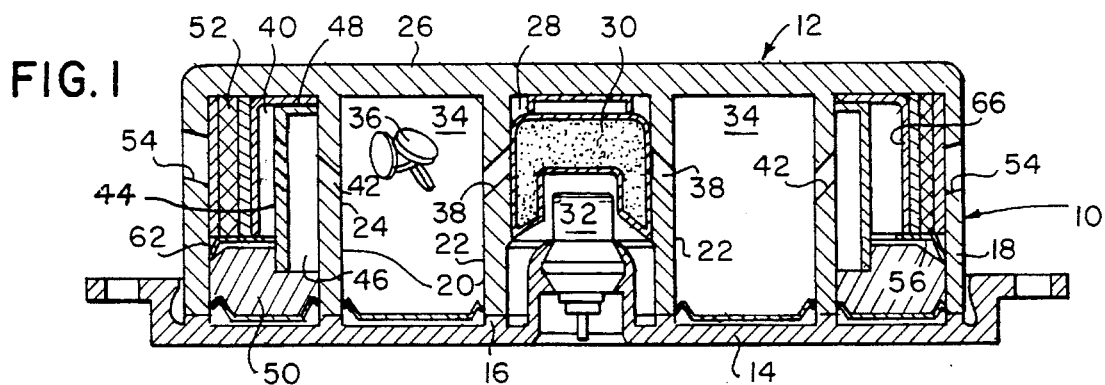
FIG. 1 is a cross-sectional side view of a seal according to the present invention used with a conventional filter pack.

With reference to FIG. 1, a seal according to the present invention is designated generally by reference numeral 10. The seal 10 is associated with a pyrotechnic air bag inflator 12 for an air bag system, and as such is located within a housing 14. The housing 14 is preferably formed as a cylinder, and for the embodiment shown, a short cylinder suitable for use with a driver's side air bag mounted to a steering wheel (not shown). As such, the housing will include a circular bottom wall 16, a cylindrical outer peripheral wall 18 and at least one cylindrical inner wall 20. In the embodiment shown in FIG. 1, there are two inner walls 20, designated as a radially interior primary wall 22 and secondary wall 24.

The housing also includes a circular upper wall 26 which is fixed to the various cylindrical walls 18–24. The top wall is typically formed as a monolithic unit with the tubular walls, and such a combined unit is often referred to as a diffuser. This diffuser is then connected to the bottom wall, typically by welding. These walls therefore define a series of chambers. For example, radially interior of the primary wall 22 there is formed a cylindrical ignition chamber 28 which will be partially filled with an ignition material 30, with the remainder of the volume of this chamber being filled by an initiator or squib 32.

Radially exterior to the primary wall there is formed an annular or tubular generator chamber 34 which will receive a volume of pyrotechnic gas generant material 36. Such material may have various chemical compositions, such as azide, and may be in granular, tablet, or other forms. The primary wall 22 will include a plurality of ignition ports 38 extending between the ignition and generator chambers to permit the hot gasses from the ignition material to flow into the generator chamber to cause the material 36 to generate an inflating gas.

Radially exterior to the secondary wall there is formed an annular filter chamber 40. The generator chamber 34 and filter chamber 40 may communicate via a plurality of gas ports 42 extending through the secondary wall 24. As may be envisioned, the gas generated by the generant 36 may pass through the gas ports 42 to enter the filter chamber 40.

Within this chamber 40 there is housed a tubular deflector 44 located in a position radially spaced from the secondary wall 24. The upper end of the deflector is sealed to the housing, but the lower end of the deflector is free, and thus defines a deflector passage 46. The sealing of the deflector may be achieved by simple abutment to the top wall. However, it is preferred that the deflector have a radially inward extending ledge 48 having an inner edge in tight abutment with the secondary wall 24. This abutment may secure the deflector in position by forming an interference fit.

The deflector may be formed of any non-porous material which will survive the heat and pressure during use, such as sheet metal. As may be envisioned, the generated gas exiting through gas ports 42 will be channeled by the deflector downward through the passage 46. This change in gas flow direction will cause many of the larger particulates to fall from the gas flow, possibly to be retained upon the deflector.

The lower end of the chamber 40, covering the passage 46, preferably is filled with a prefilter 50. The prefilter will serve as a particulate filter for the gas flow, and also as a heat sink to lower the gas temperature. The prefilter may be formed of various materials such as woven wire or wire mesh, but is preferably formed of a mass of knitted wire.

As shown, the prefilter extends across the entire radial depth of the chamber 40, and upward above the lower edge of the deflector 44, at least on its radially exterior face. The prefilter will thus help to support the free end of the deflector. As may be envisioned, the presence of the bottom wall 16 causes the gas flow to turn upward over the free end of the deflector, and thus pass through the prefilter.

Located above the prefilter, radially exterior of the deflector, is a radial filter 52. The filter takes the general form of a tube having its outer face positioned at least in proximity to, and typically in abutment with, the inner face of the outer wall 18, and its upper end in abutment with the top wall 26. The outer wall 18 includes several exit ports 54 at positions above the lower end of the filter 52. As may be envisioned, the gas travelling downward from the prefilter 50 will thus pass through the inner face of the filter 52, through the outer face of the filter, and then exit the housing via exit ports 54.

The filter 52 may take various forms. For example, the filter may be a multi-layer assembly of screens having various gauges, ceramic papers, metal felts, etc. as is known in the art. The screen could also be formed of a rigid, reticulated, monolithic filter, such as a ceramic agglomerate, or a carbonaceous, metallic or ceramic foam as described in copending U.S. Pat. application Ser. Nos. 08/318,367, filed Oct. 5, 1994, 08/114,211, filed Aug. 30, 1993, and 08/220, 485, filed Jul. 26, 1994, all assigned to the present assignee, which are also included herein by reference.

Other suitable, substantially rigid, materials are sintered metal fiber structures available from Pall Corporation of Cortland, N.Y., and sintered powder metal structures available from Newmet Krebsoge, Inc. of Connecticut. Such rigid filters are preferred as their construction and placement in the housing is simplified in comparison to multi-layer filters. Additionally, such a rigid filter could be used with other layers such as an inner layer of ceramic paper or wire mesh, or a supporting outer wrap of wire mesh.

Figure 2:
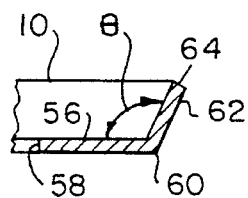
FIG. 2 is a cross-sectional side view of the seal of FIG. 1 prior to placement in the housing.

To ensure that the gas passes through the filter, rather than around it, there is provided the filter seal 10. The filter seal 10 takes the general form of a ring or annulus. As is best shown in FIG. 2, the seal includes a radially extending presser foot 56. The presser foot include a cantilevered edge 58 and connecting edge 60. The presser foot is placed in contact with the lower end of the filter 52, with the cantilevered edge 58 furthest from the housing wall, and the connecting edge 60 closest to the housing wall (in this embodiment outer wall 18). The length of the foot 56 is preferably such that it extends radially across at least a majority of the radial depth of the filter, and most preferably across the entire radial depth, as shown.

Connected to the connecting edge 60 of the presser foot is an angularly oriented engagement leg 62 having a free edge 64. In the embodiment of FIGS. 1 and 2, the engagement leg is directly connected to the edge 60. As shown in FIG. 1, the leg 62 (or at least a portion thereof) is placed in contact with the housing wall when assembled in the housing. This contact is a relatively tight interference fit.

To ensure that the proper fit is achieved without the need for close tolerances, the leg 62, in the unassembled condition of FIG. 2, forms an obtuse angle θ with respect to the foot 58, with the diameter of the free end 64 being larger than that of the housing wall. Since the connecting edge 60 is closest to the housing wall when assembled as in FIG. 1, the free end of the leg will thus at least tend to extend toward the housing wall. Furthermore, the seal 10 is formed of a material having some amount of resilience, such as sheet metal. A band of sheet metal may thus be plastically deformed to the configuration of FIG. 2, yet still provide a sufficient amount of resilience to permit the leg 62 to be placed within the diameter of the housing wall.

As may be envisioned, during this insertion the leg 62 will resiliently deform to reduce the angle θ. As such, the natural resilience of the leg will create a force against the housing walls which will resist the movement of the seal 10. This force should of course be sufficient to resist all unintentional movement yet allow the insertion of the seal. Additionally, the seal may be sized and formed such that the angle θ remains an obtuse angle even after insertion. As such, attempts to move the seal in a direction opposite to that of insertion will cause the free end 64 of the leg to "dig" into the housing wall, further resisting movement.

It may be seen that the seal 10 formed of sheet metal provides an inexpensive seal which is easy to form, and may be inserted into position with only a simple pressing motion. Furthermore, the seal resists movement out of its proper position. In addition to the desired resilience, the use of sheet metal also provides excellent resistance against the heat and pressure experienced during air bag deployment. In fact, the resilience may improve sealing, as the increased fluid pressure within the housing during deployment may cause the sheet metal to deform slightly against the filter 52 and the housing wall to provide a greater seal. A further advantage of the sheet metal is that there is no outgassing.

It is also noted that the seal in this embodiment does deflect the gas flow around the end of the filter, as does any seal. However, the seal does not provide a true or large scale deflection such as has been known in the art for removing particulates. Additionally, the very name of the seal 10 indicates that this member provides the seal for the filter, rather than a separate elastomeric seal element mounted to a deflector as in the prior art.

The seal 10 thus provides an effective seal against the generated gas passing around the associated upper end of the filter. However, the upper end of the cylindrical filter typically must be sealed also. To this end there could be provided a further seal 10, with this seal 10 having its foot 56 resting against the top wall of the housing and its leg 62 abutting against the inner face of the filter. However, in this embodiment the presence of the deflector 46 permits the elimination of a second seal.

As shown in FIG. 1, a radially inner (and typically innermost) layer 66 of the filter 52 is formed with a longitudinal length greater than that of the remaining layers. This additional length is bent radially inward, and is held between the ledge 48 of deflector 44 and the bottom wall 16 of the housing. This pressing will hold the layer 66 in position and prevent the generated gas from passing around its lower end, and thus the lower end of the filter. This layer 66 is formed of a material which is sufficiently flexible to permit the necessary bending yet sufficiently rugged to maintain its integrity. Wire mesh and sintered metal mats are two examples of acceptable materials.

Figure 3:
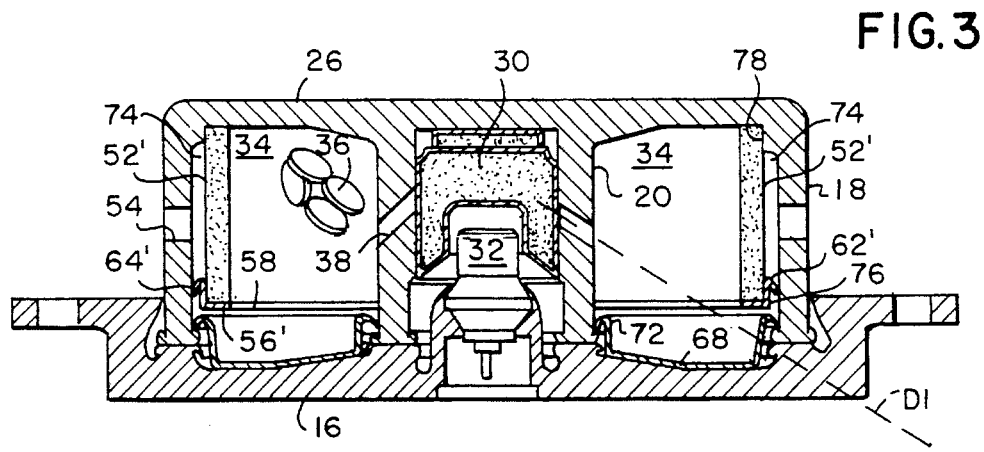
FIG. 3 is a cross-sectional side view of a second embodiment of a seal according to the present invention used with a filter to form a plenum.

With reference to FIG. 3, a second embodiment of a seal according to the present invention is shown, and is generally identified by reference numeral 10'. In this embodiment, the seal 10' is employed in a pyrotechnic air bag housing 14' having a different design from that in FIG. 1, but could be used in the housing of FIG. 1.

With regard to the housing 14', it takes the general form of a cylinder and includes a circular bottom wall 16, a peripheral outer wall 18, a tubular inner wall 20, and a top wall 26. Also as with the first embodiment, these walls define an centrally disposed cylindrical ignition chamber 28 which holds an ignitor material 30 and is in communication with a squib 32. Furthermore, the housing includes a tubular generator chamber 34 containing a gas generating material 36, with a plurality of ignition ports 38 extending radially through the inner wall 20, and a plurality of exit ports 54 extending radially through the outer wall 18.

As a further similarity, the embodiment of FIG. 2 includes a tubular filter 52' located adjacent to the outer wall 18 and the exit ports 54. As is apparent, the primary difference between the housings of FIGS. 1 and 2 is that the second embodiment employs a two-wall design which eliminates the wall between the gas generating material and the filter.

This housing configuration of course eliminates the material associated with the removed wall to reduce cost and weight. This housing is also amenable to simple construction. Specifically, the top wall 26 and inner and outer walls 20 and 18 may be formed as a single unit by casting, drawing or similar metal forming steps, and then secured to the bottom wall 16 by inertia (i.e., spin) welding. Due to the typically granular or pelletized form and reactive nature of the of gas generating material 36, is desirable to secure and protect the gas generating material during the friction welding process.

To this end there is provided a retainer 68 taking the general form of an upwardly concave annulus (i.e, a section of a hollow toroid). The retainer is preferably formed of sheet metal and includes an annular main body 70 having inner and outer radial edges. Each of these edges include an upward turn, and then a radially outward reverse turn 72. In a manner similar to the seal 10, the diameter of the free edge of the outer reverse turn is made slightly larger than that of the outer wall, and the diameter of the free edge of the inner reverse turn slightly smaller than the inner wall 20, such that an interference fit is formed. In this manner the gas generant 36 may be placed in the housing and the retainer pushed into position to retain and cover the generant. The retainer will be discussed more below.

As noted above, the second embodiment includes a filter 52'. As with the first embodiment, the filter may be formed of a plurality of prior art layers, a rigid one-piece element as noted, or a combination. For this embodiment, the rigid one-piece filters are preferred. Also as noted, it is desired that the generated gas pass uniformly through the filter. To assist in this, the seal 10 of this embodiment provides a plenum chamber 74.

In particular, the outer diameter of the filter has a diameter less than that of the outer wall, such that an tubular void is formed between the filter and the outer wall, which void defines the plenum chamber. As may be envisioned, the plenum chamber permits an area of reduced pressure around the entire periphery of the filter, not just over the exit ports 54. This permits a much greater amount of the filter to be used, increasing filter efficiency.

To maintain the spaced configuration of the filter, it is necessary to provide radial support. This is provided in part by the seal 10'. As shown, the seal is similar to that of the first embodiment, in that it contains a presser foot 56' having a cantilevered edge 58' and a connecting edge 60'. Additionally, the seal 10' also includes a leg 62' forming an obtuse angle with the foot and having a free end 64' which will engage the outer wall in a manner similar to that of the first embodiment. In this embodiment however, there is provided a tubular filter skirt 76 between the foot and the leg.

In particular, the skirt 76 is a monolithic portion of the seal, and has a tubular form with a lower end at the connecting edge 60' and an upper end at the leg 62. As may be seen the support skirt abuts against the outer face of the filter at its lower end. As such, the support skirt, through the leg 62, provides radial support to the lower end of the filter, reducing hoop stresses within the filter. What is more, since the skirt and leg are positioned between the filter and the outer wall, they help to form the plenum chamber 74. Additionally, the resilient nature of the seal absorbs slight variations in filter dimensions, such that the prior art need to machine the rigid filter to a close fit with the outer wall is eliminated. Furthermore, the seal provides its primary function of sealing the end of the filter properly, and in a similar manner to that described for the first embodiment.

This seal at the lower end of the filter may, by itself, be sufficient to support the filter against destruction during deployment, depending upon the particular filter material used. However, it may be desirable to support the filter at other locations as well, and in particular the upper end. To this end a seal 10 as in the first embodiment may be placed between the filter and the outer wall (not shown), with the presser foot 56 abutting against the top wall 26 and the leg 62 abutting against the outer face of the filter. As with the seal 10', such a seal would tend to support the filter, provide the desired spacing for the plenum chamber, and absorb dimensional variation. The sealing characteristics of the further seal 10 may be sufficient, especially if the filter is strongly abutted against the top wall 26. To improve sealing, the presser foot 56 could be provide with a small leg, similar to leg 62, at its cantilevered end 58, such that this further leg could "dig" into the outer wall and improve sealing.

It is preferred, however, to support the upper end of the filter using a monolithic housing shoulder 78, as shown in FIG. 3. With this arrangement, a circumferential shoulder is formed on the inner face of the top wall 26, between the filter and the outer wall 18. This shoulder may be easily formed during the casting or drawing operation used to form the housing. As may be seen, the outer face of the filter at the top end will abut against this shoulder to provide the desired support and provide the plenum chamber spacing. Additionally, the increased contact area between the filter and housing, provided by the abutment with the shoulder, may provide sufficient sealing at this upper end. The only drawback to this arrangement is that it does not absorb dimensional variation in the filter. However, the support provided at the lower end, together with any support radial support provided at the upper end may be sufficient to reduce hoop stress to an acceptable level. Furthermore, a dimension absorbing layer, such as a paper or mesh, could be placed on the outer face of the filter to reduce this problem. Alternatively, the shoulder could be modified to a frustoconical section tapering upward. This would allow the filter to seat at whichever point on the cone corresponds to its dimensions, and would additionally provide at least some radial support.

Figure 4:
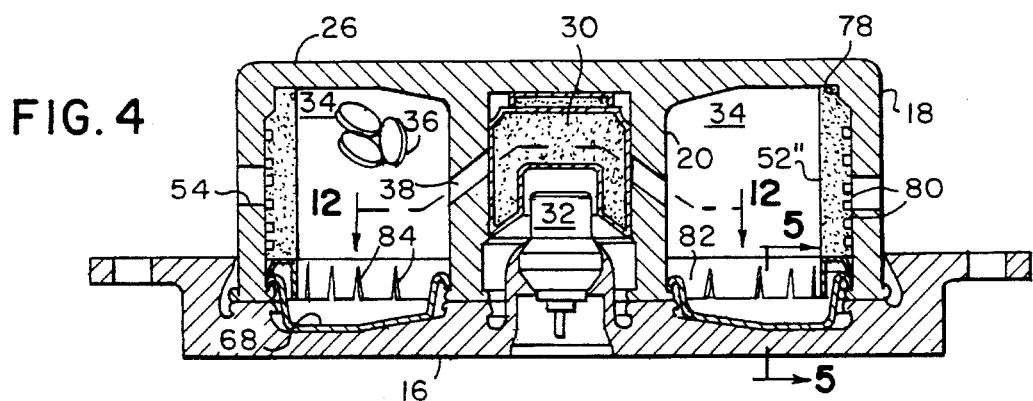
FIG. 4 is a cross-sectional side view of a third embodiment of a seal according to the present invention used with a tubular rigid filter, the filter of this invention having plenum-forming lands.

With reference to FIG. 4 a third embodiment of a seal according to the present invention is designated by reference numeral 10", and is shown together with a filter according to the present invention, identified by reference numeral 52". These elements are shown in a housing corresponding to that of FIG. 3, with like items identified by like reference numerals. As with the seal and filter of FIG. 3, however, the seal and filter of FIG. 4 could of course be used in a housing as shown in FIG. 1 or other conventional prior art housings.

In this embodiment, the filter 52" is again formed as a tube, but does contact the outer wall, at least at discrete locations. Specifically, the outer face of the filter 52" is formed with a plurality of protrusions 80, and the free ends of these protrusions contact the outer wall 18. The protrusions may be formed on the filter, in general, by forming the filter of, or with, a layer of a rigid filter material as discussed above. The outer face of this rigid material may be milled, embossed, cut or otherwise provided with a series of grooves or depression to thus define and form the protrusions. Alternatively or additionally, the protrusions may be formed during formation of the rigid filter, as during a molding process.

The protrusions may take a variety of patterns. It is preferred, however, that the grooves or depressions between the protrusions join together or communicate such that together they define at least one plenum chamber 74' between the outer face of the filter and the outer wall. Where various grooves meet to form plural plenum chambers (such as longitudinally upper and lower circumferential chambers), it is preferred that each chamber have direct access to at least one of the exit ports 54.

Figure 6:
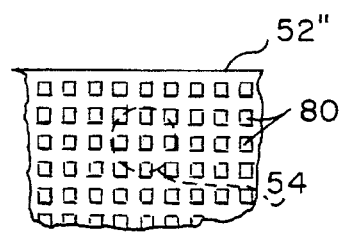
FIG. 6 is detail view taken along line 6—6 of FIG. 4.

An example of a suitable pattern of protrusions is shown in FIG. 6, where there are provided intersecting longitudinal and circumferential grooves to form numerous square or rectangular protrusions 80. While such a repetitious pattern is not required, it is preferred as it will permit a generally equal area of protrusions within the periphery of each of the exit ports 54, resulting in an equalized flow with no one port being preferred due to a less restrictive flow path. In addition to equalizing flow, this also eliminates the need to orient the filter in any particular position, which could be required to provide such equal flow with larger protrusions.

As may be envisioned, the contact of the protrusions against the outer wall 18 will provide the desired plenum chamber in the form of the intermediate grooves, and will support the filter to reduce the potentially destructive hoop stresses. However, this arrangement does suffer from the drawback of dimensional criticality to ensure that all or most of the protrusions actually do contact the wall to provide the radial support. This drawback may be reduced by the use of a resilient paper or mesh layer between the filter and the outer wall.

The seal 10" in this embodiment is, in large part, identical to that shown in the first embodiment. The seal includes the presser foot against the lower edge of the filter and the leg contacting the outer wall. The only appreciable difference in this embodiment is at the cantilevered edge 58. In this embodiment, there is provided a downward extending generant skirt 82 connected to the cantilevered edge 58. The generant skirt 82 will serve as a boundary to hold the generant in position, and in particular against moving radially outward of the cantilevered edge 58 prior to the retainer 68 being secured in position.

Specifically, during assembly (and before application of the bottom wall 16) the housing will be upside-down, and the generant 36 poured into the chamber 34. The skirt 82 will prevent the generant from spilling over on "top" of the seal. As such, when the retainer is pushed downward into position, the outer reverse turn 72 will move freely between the skirt 82 and the outer wall 18, and will not crush any generant 36 resting upon the seal. This skirt 82 may also be useful for the embodiment of FIG. 3, and the seal 10' of that embodiment may be provided with such.

While the skirt 82 improves the loading of the generant material 36 into the housing, care should be taken that it does not degrade the sealing characteristics of the seal. In particular, considering the seal 10' of FIG. 3, it may bee seen that, during deployment, the increased pressure within the generant chamber 34 and the lesser pressure within the vented plenum chamber will tend to force the presser foot 56 against the end of the filter, improving the seal.

A similar consideration of the seal 10" of FIG. 4, including the skirt 82, will show that there is a possibility of the sudden pressure increase pushing the skirt radially outward. Depending upon the flexibility or resiliency of the seal, this may tend to pry the presser foot 56 from the end of the filter, reducing or eliminating the desired seal. To reduce this possibility, it is desired to form the skirt as resilient as possible while still providing its generant retaining characteristics. To this end, the skirt may be provided with a lesser thickness than the remainder of the seal, or the free end of the seal may be provided with a plurality of circumferentially spaced notches 84 (best shown in FIG. 5), or both. Other arrangement for weakening the skirt, such as perforations through the skirt and/or the connection between skirt and presser foot, could of course be employed, and are generally referred to as means for reducing the strength of the skirt.

Figure 5:
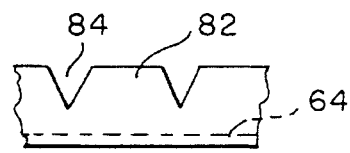
FIG. 5 is a detail view taken along line 5—5 of FIG. 4.

Thus weakened, any flexing of the skirt radially outward upon experiencing the pressure can be limited to the skirt itself, and is not transferred to the presser foot. While various strength reducing means will permit this, the triangular notches of FIG. 5 are preferred, as they may also assist in the manufacture of the skirt. Specifically, forming the monolithic seal from flat sheet metal stock will require that the skirt be drawn or formed from the center section of the sheet, increasing the diameter of this section appreciably. By forming the notches, this drawing process and resultant increase in diameter are simplified.

From the above it may be seen that the sheet metal seals of the present invention are inexpensive, effective, and can provide additional functions such as the plenum chamber and generant barrier when used with filters for radial-type inflators. The concept of the sheet metal seal also has application in axial-type inflators.

Figure 7:
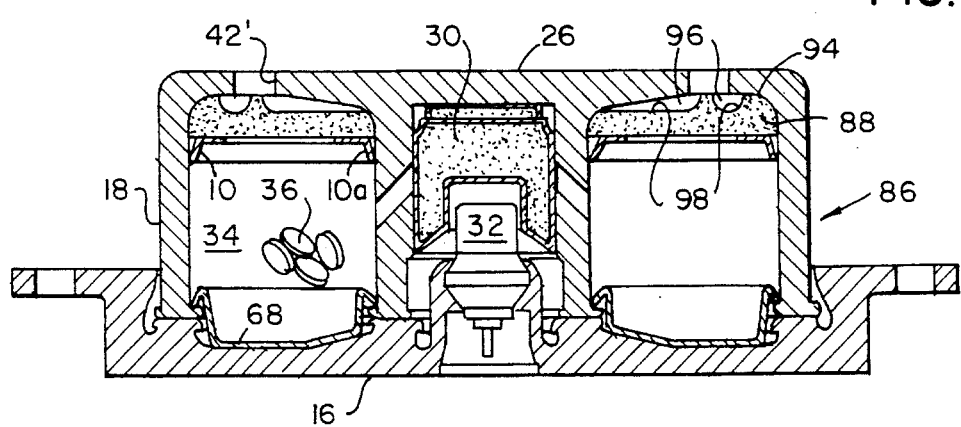
FIG. 7 is a cross-sectional side view of a seal according to the a fourth embodiment of the present invention used with a disk filter according to the present invention, the filter having plenum-forming lands.

With reference to FIG. 7, there is shown an axial-type air bag inflator generally designated by reference numeral 86. The inflator includes numerous components and features similar to the radial-type inflators of FIGS. 1 and 3, and like elements are identified by like reference numerals. For the sake of brevity, the important differences between these types of inflators is the placement of the exit ports, the filter, and thus the seals.

In particular, the exit ports 54' extend through the top wall 26 at locations providing communication with the generant chamber 34. A preferred arrangement is six such ports equally spaced about a circumference at a common diameter. Located between the generant 36 and these ports, in abutting relation to the top wall 26, is an axial filter 88. The filter 88 takes the general form of an annular plate, with a circular inner edge 90 and a circular outer edge 92. The inner edge 90 forms a central aperture having a diameter which closely receives the inner wall 20. In a similar manner, the outer edge 92 has a diameter to be closely received within the outer wall 18.

To mount this axial filter 88 there are provided two seals according to the present invention, an outer seal 10 and an inner seal 10*a*. The outer seal 10 is substantially identical to the seal 10 of FIG. 1. The operation of the seal 10 is also substantially similar, in that the presser foot 56 abuts against the filter, and the leg 62 abuts against the outer wall 18. Again, the leg originally forms the obtuse angle but is resiliently biased inward when the seal is pressed into position. The result is also similar, in that the resilient leg tends to resist removal of the seal, the pressure of deployment tends to press the seal into position and increase its effectiveness, and it is simple to produce and install.

The inner seal 10a is quite similar to the seal 10 of FIGS. 1 and 7, with the sole exception that the seal 10a has a reduced diameter, and is "inside-out". In particular, the presser foot extends radially outward and the leg angles radially inward for the seal 10a while this is reversed for the seal 10. The operation and results, however, are unchanged, with the leg holding the seal in position and the foot pressing the filter.

As such, while the axial-type inflator 86 requires two seals according to the present invention, this is typically true of the prior art also, and is not a disadvantage. Beyond this, the seals 10 and 10a are inexpensive, easy to install with only a simple pressing motion, securely hold and seal the filter, and do not outgas.

While the seals described above hold and seal the filter, the axial-type inflator 86 can suffer from many of the same problems of uneven flow as the radial inflators. As such, the present invention additionally provides arrangements for providing a more uniform flow.

A first embodiment is shown in FIG. 7, where, in a manner similar to that in FIG. 4, the filter is formed as (or including) a rigid one-piece filter, and is provided with a plurality of upwardly extending protrusions 94 which abut against the top wall. In a manner similar to the radial filter, the spaced protrusions define grooves or depressions between them, with these grooves communicating to act as a plenum chamber 96.

The particular pattern of protrusions may of course vary widely. in the embodiment of FIG. 7 the protrusions take the form of annular ridges 98 at the inner and outer edges and at a radially central location. As such, the ridges define two separate annular plenum chambers. As in the radial embodiment, it is desired that all chambers have equal access to the ports, and as such the central ridge 96 may be located to bisect the exit ports 54'.

Figure 8:
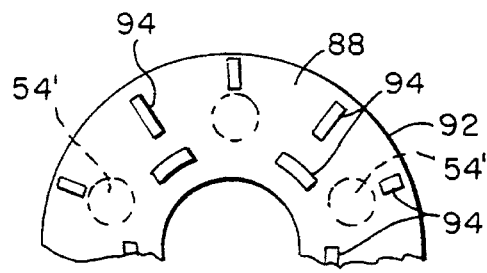
FIG. 8 is a detail plan view of the filter of FIG. 7.

For the annular filter 88, the deployment pressures will not create hoop stresses, and as such there is typically less likelihood of failure (i.e., breakage) of the rigid filter. As such, it may be possible to form the pattern of protrusions 94 to be much more widely spaced than in the radial embodiment. This may permit the protrusions to take more complex forms such as in FIG. 8 to channel the gas in different directions to slow the gas. This reduced likelihood of failure also results in less need for the filter 88 to conform closely to the interior face of the top wall for well distributed support.

Figure 10:
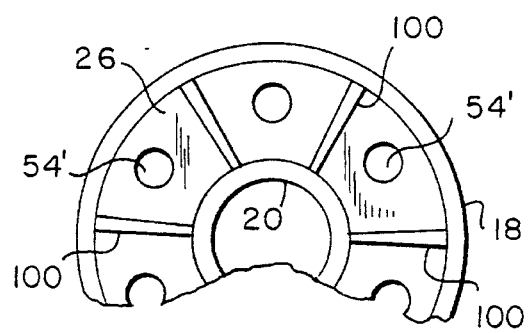
FIG. 10 is a detail plan view of the housing of FIG. 9.
Figure 9:
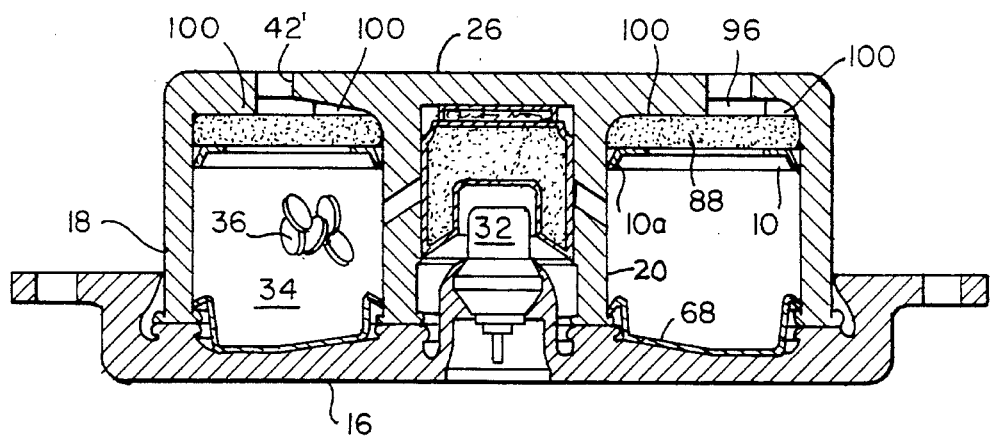
FIG. 9 is a cross-sectional side view of a housing according to the present invention, having plenum-forming lands.

An alternative arrangement for creating the plenum chamber 96 is shown in FIGS. 9 and 10. In this embodiment it is the inner face of the top wall which includes protrusions 100 which abut against the upper surface of the filter 88. With this arrangement depressed areas or grooves between the protrusions 100 form the plenum chamber(s) 96. As shown, the upper surface of the filter is flat. However, protrusions could be formed on the upper surface of the filter so long as the protrusions do not fill the plenum chamber(s).

As with the filter protrusions, the top wall protrusions, may take various shapes and positions. However, the top wall protrusions may advantageously serve a dual purpose with the proper form. Specifically, the protrusions, if arranged properly arranged, will act as reinforcement ribs for the top wall, permitting the thickness of the top wall to be reduced while retaining the same strength as a non-ribbed wall. This reduction in thickness is of course offset partly by the material of the protrusions, however, an overall material reduction can be achieved, which will result in less material used (saving natural resources and reducing cost) and less weight for the inflator (reducing shipping costs and saving vehicle fuel).

The particular arrangement of the reinforcing protrusions will of course depend upon the material properties, the deployment forces, and engineering principles. However, it is preferred to form full radial lines between the inner and outer walls. This arrangement will not permit a single common plenum chamber, but does allow several discrete plenum chambers between the protrusions, such as one for each exit port. This arrangement is additionally easy to produce, as the protrusions may be easily formed in the top wall in the same drawing operation used to form the diffuser.

As such, the embodiment of FIGS. 9 and 10 provides an inflator which is easily and reliably sealed about the filter, is amenable to the use of a rigid one piece filter, includes a plenum chamber for improved filter efficiency, and has reduced cost and weight.

While these advantages are believed to be significant, this embodiment is, as noted, an axial-type inflator. As is known in the art, all axial inflators suffer from the same drawback in that they are not thrust neutral. In particular, during deployment the inflation gas leaves the exit ports with considerable force. If the inflator is unintentionally deployed prior to mounting, such as during shipping, the deployment force acts as a thrust of a rocket and is sufficient to propel the axial-type inflator in a dangerous manner. In contrast, the radial-type inflators of FIGS. 1, 3 and 4 are thrust neutral, meaning that the deployment forces will exit equally about the periphery, cancelling each other out, and will not propel the inflator.

Figure 12:
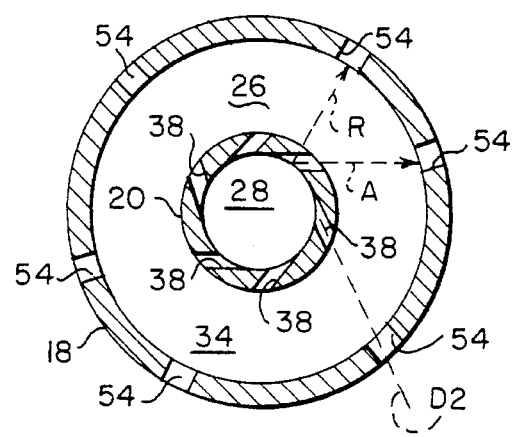
FIG. 12 is a plan view, taken along line 12—12 of FIG. 4, of a housing according to the present invention having tangential porting.

With reference to FIG. 12, there is shown an inflator 102 which keeps the advantages of the annular filter and ribbed top wall while using radial exit ports for a thrust neutral air bag.

Many of the components in the inflator 102 are similar to those in FIG. 9, and those like elements are identified with like reference numerals. The main difference is the use of radial exit ports 42 which communicate with the plenum chambers 96. This is simply effected by placing the ports 42 at a position on the outer wall such that they open into the chambers 96. The port may be partially obscured by the filter 88, depending upon the relative heights of the plenum chamber and the ports, and upon port location. This is believed to be acceptable to the extent that the gas still provides sufficiently uniform flow.

To ensure that the ports 42 are not obscured by the filter, and that a uniform flow is more likely, a filter 104 may be used which has an outer edge diameter less than that of the outer wall. This results in an annular volume 106 being formed radially between the filter and outer wall. This volume is in direct communication with the plenum chamber(s) 96. As such, gas flowing through the filter from the bottom to the top may pass into the plenum chamber(s) and then into the volume 104. This arrangement also permits greater flexibility in port placement, with the limiting factor being that the port must not extend below the filter seal.

With regard to the seals, the inner seal 10a may be identical to that described above. The outer seal may also be identical to seal 10 described above. However, various modifications to the outer seal may be desirable. For example, the circumferential edge of the filter 104 (facing the ports) is not abutting the outer wall, and gas may pass through the filter from the bottom face to this edge. This may be acceptable, so long as the flow path is sufficiently long that proper filtration occurs.

In this regard, it is noted that the seal obscures the filter where it covers. As such, the seal may be formed such that the cantilevered edge 58 of the presser foot is located at a position on the filter such that flow from that position to the edge of the filter provides the desired filtration. To do this, the radial length of the presser foot may simply be extended. Alternatively or additionally, the radial length of the leg may be extended, or the final angle θ increased. These latter two possibilities may be preferred, as ensuring that the connecting edge 60 of the seal is abutting the filter (as shown in FIG. 12) may provide a more rigid assembled condition.

With this embodiment the advantages of a plenum chamber are provided with minimal effort (i.e., during diffuser formation), and with the added benefit of reduce material and weight. Additionally, this embodiment is well suited to the use of a solid monolithic annular filter, with their greater reliability and relaxed size tolerances. Furthermore, this embodiment is well suited for the seals according to the present invention, permitting reliable sealing and simple press insertion. Also, as noted above, this arrangement provides radial porting for a thrust neutral inflator.

Figure 11:
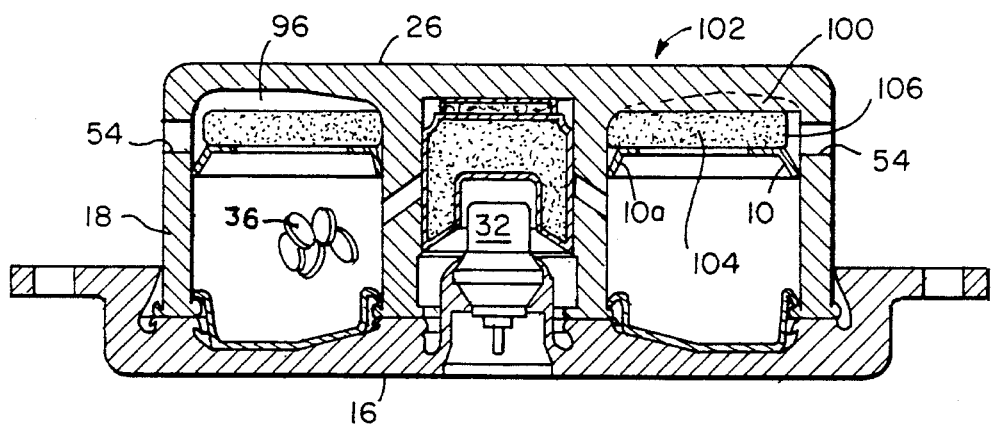
FIG. 11 is a cross-sectional side view of a housing according to the present invention, having plenum-forming lands used with a reduced diameter filter according to the present invention.

While not readily apparent, this embodiment also provides another advantage: reduced inventory. Specifically, while FIG. 11 shows the use of radial ports, this group of components could be used alternatively with axial ports, with no modification required except the port location. As such, these various components may be kept in stock, with the outer wall 18 not provided with any ports, and assigned to orders for either axial or radial inflators. This would of course reduce the need for stocking both axial and radial deflectors.

Attention will now be drawn to an inventive ignition port arrangement according to the present invention, and useful with the housings and seals discussed above.

In each of the embodiments above, the chamber 34 holding the generant surrounds the ignitor 30, and the ignitor gas will vent through the ignition ports. This ignitor gas is most effective when it directly impinges upon the generant 36. In this regard it is noted that the ignition gas will exit the ports at high velocity and with considerable force. As such, those areas in the generant chamber 34 which are in radial line with the ignition ports 38 will provide an excellent response, with areas further from such radial lines providing progressively worsened response.

Considering this, a very effective shape for the generant chamber would be a short and relatively wide tube, as this would provide the largest volume for the generant chamber with the least distance from the radial lines. Such a shape is inherently formed with many axial-type generators, as illustrated in FIGS. 7, 9 and 11. This placement of the filter inherently reduces the height of the generant chamber, providing the desired short, wide cylinder.

In contrast, the radial-type housings shown in FIGS. 1, 3 and 4 provide a less efficient chamber shape. Specifically, the placement of the filter at the radial face results in a tall, thin tube shape for the generant chamber 34. As such, the generant 36 at the upper and lower longitudinal extremes of these chambers is not provided with a good supply of the igniting gas, and does not respond as desired. Additionally, since the radial filter is close to the ignitor ports, and directly in their path, increased forces are transmitted to the radial filter in comparison to the axial filter.

To reduce or eliminate this problem, the ignitor ports 38 according to the present invention are provided with an orientation to increase ignition gas contact while at the same time reduce the impingement force of the gas.

As noted above, each of the ports 38 is formed by an opening extending through the inner wall 20 which surrounds the ignitor material 30. These openings are cylindrical, and are typically formed by drilling. Being cylindrical, each port has a longitudinal axis. As is best shown in FIG. 11, the longitudinal axes of the ignition ports 38, when projected upon a plane normal to the longitudinal axis of the cylindrical housing (hereafter referred to as a projected axis), do not extend radially from the longitudinal axis, but at an angle to such radial lines. While not required, it is preferred that each projected axis form an equal angle with an associate radial line, and that these angles be swept in the same direction from the associated radial line, such as the clockwise direction shown in FIG. 11.

This angle with respect to the associated radial line may be any angle from one to ninety degrees, or more, with a ninety degree, and thus tangential, angle being shown. As noted above, these angles are measure from the projected axes. The need for projection is clear from FIG. 4, as the longitudinal axes of the ports may form an angle with the longitudinal axis of the housing in a plane containing the housing axis.

This further angle is known in the prior art to direct the ignition gas towards the center of the generant chamber, or is simply a byproduct of the need to drill the ignition ports over the edge of the outer wall 18, as shown by the drill line D1 in FIG. 3. Another access for drilling the ignition port holes of the present invention (when the housing is of the two-wall form of FIGS. 3 and 4) is through the exit ports 54, as indicated by the drill line D2 in FIG. 11. As may be envisioned, either drill line D1 or D2 will permit formation of any of the desired angles from tangential to radial.

The effects of the present port arrangement is illustrated by comparison of lines R and A of FIG. 11. Line R is a projected flow path for a prior art radial port, while line A is a projected flow path for an angled port according to the present invention.

First, it is noted that the length of line A, from the inner to the filter, is greater than that of line R. As such, the ignition gas following line A of the invention will contact more of the generant material, improving performance. Additionally, with this increased distance the velocity of the ignition gas at the filter will be reduced compared to that of line R, such that the filter is subjected to less impact force in the present invention.

Second, line R is substantially normal to the filter, while line A forms an angle. As such, what impact from the ignition gas is transferred to the filter is a glancing blow for the present ports, while the prior art ports cause the ignition gas to hit head on. As such, the force reduction due to increased distance is further attenuated by the angle of the force.

Finally, by forming all of the projected angles in the same direction it may be seen that a swirling of the ignition gas will be achieved through the generant chamber, with the flow from the various ports working together with common velocity components. This is in contrast to the prior art ports where the ignition gas deflected off the filter collides and cancels out gas velocity. As such, the ignition gas is believed to maintain a higher velocity within the chamber for increased contact with the generant per unit time. Again this increase in gas velocity within the chamber is effected with a decrease in the forces transmitted to the filter. As such, performance of the air bag can be increased, while the reduced filter forces increase the possible materials which may be used for the filter.

The combination of increased gas flow and reduced impact forces make this port arrangement particularly suitable for use with radial-type inflators. However, this arrangement could also be used to increase the performance of axial-type inflators. In general, this porting arrangement could be used with any inflators having an ignition material separated from a gas generant by an intermediate wall.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A seal for use in an air bag having a cylindrical housing with a tubular wall having an inner face, and a gas filter in proximity to said inner face, said seal comprising:

a presser foot for engagement with the filter, said presser foot having the form of an annular plate, said presser foot having a radially interior cantilevered edge and a radially exterior connecting edge, said connecting edge having a diameter less than that of the inner face of the tubular wall; and an engagement leg extending from said connecting edge to a free edge and having the form of a frustrum of a cone, said engagement leg forming an obtuse angle with respect to said presser foot, said free edge having a diameter greater than that of the inner face of the tubular wall, said presser foot and said engagement leg being formed monolithically of a resilient sheet metal, with sufficient resilience that said engagement leg may resiliently deform such that said free edge may be received within the inner face of the tubular wall.

2. The seal of claim 1, further including:

a generant skirt extending from said cantilevered edge to a free edge.

3. The seal of claim 2, wherein said generant skirt includes a plurality of notches extending inward from said free edge of said skirt.

4. The seal of claim 1, further including:

a tubular filter skirt having a first longitudinal end mounted to said connecting edge and a second end mounted to said engagement leg, such that said engagement leg extends from said filter skirt, said filter skirt having a diameter to closely receive an outer face of the filter.

5. An inflator for an air bag, comprising:

a cylindrical housing having circular top and bottom walls, and a tubular outer wall, said walls defining a chamber therein a gas filter located within said chamber in proximity to said outer wall;

a filter seal, including a presser foot engaged against said filter, said presser foot having the form of an annular plate, said presser foot having a radially interior cantilevered edge and a radially exterior connecting edge, said connecting edge having a diameter less than that of said outer wall, and an engagement leg extending from said connecting edge to a free edge and having the form of a frustrum of a cone, said engagement leg forming an obtuse angle with respect to said presser foot, said free edge having a diameter greater than that of said outer wall, said presser foot and said engagement leg being formed monolithically of a resilient sheet metal, with sufficient resilience that said engagement leg is resiliently deformed with said free edge abutting said outer wall.

6. The inflator of claim 5, wherein said filter is formed as a tube having longitudinal ends, and said presser foot abuts against one of said longitudinal ends.

7. The inflator of claim 6, wherein said seal further includes:

a generant skirt extending from said cantilevered edge to a free edge, said skirt forming a barrier for maintaining a gas generant within the interior of said filter and said skirt.

8. The inflator of claim 7, wherein said generant skirt includes a plurality of notches extending inward from said free edge of said skirt.

9. The inflator of claim 6, wherein said filter has a diameter less than that of said outer wall, such that an annular plenum chamber is formed therebetween, and wherein said seal further includes a tubular filter skirt having a first longitudinal end mounted to said connecting edge and a second end mounted to said engagement leg, such that said engagement leg extends from said filter skirt, said filter skirt having a diameter to closely receiving said filter, said engagement leg extending across said plenum chamber.

10. The inflator of claim 9, wherein said housing includes a radially inward facing shoulder on said top wall, and the other of said longitudinal ends of said filter abuts against said shoulder.

11. The inflator of claim 6, wherein said outer wall includes a plurality of exit ports extending therethrough, and wherein an outer circumferential face of said filter includes a plurality of protrusions defined by intermediate grooves and depressions, said protrusions being closely received against said outer wall, and at least a portion of said grooves and depressions being in communication to define at least one plenum chamber between said filter and said outer wall, at least one said plenum chamber communicating with each of said ports.

12. The inflator of claim 5, wherein said filter is substantially planar with an outer diameter, and is located in proximity to said top wall, said presser foot of said seal abutting against said filter in proximity to said outer diameter.

13. The inflator of claim 12, wherein said housing further includes a tubular inner wall concentrically mounted between said top and bottom walls and interior of said outer wall, and said filter is annular with an inner diameter receiving said inner wall, and wherein said inflator further includes a second one of said seals, said presser foot of said second seal abutting against said filter in proximity to said inner diameter, and said free end of said engagement leg abutting said inner wall.

14. The inflator of claim 12, wherein said housing includes a plurality of exit ports opening onto said chamber, and wherein said filter includes a plurality of protrusions defined by intermediate grooves and depressions, said protrusions being closely received against said top wall, and at least a portion of said grooves and depressions being in communication to define at least one plenum chamber between said filter and said top wall, at least one said plenum chamber communicating with each of said ports.

15. The inflator of claim 14, wherein said exit ports extend through said top wall.

16. The inflator of claim 12, wherein said housing includes a plurality of exit ports opening onto said chamber, and wherein said top wall of said housing a plurality of protrusions extending into said chamber and defined by intermediate grooves and depressions, said protrusions being closely received against said filter, and at least a portion of said grooves and depressions being in communication to define at least one plenum chamber between said filter and said top wall, at least one said plenum chamber communicating with each of said ports.

17. The inflator of claim 16, wherein said protrusions strengthen said top wall against pressures generated within said chamber.

18. The inflator of claim 16, wherein said exit ports extend through said top wall.

19. The inflator of claim 18, wherein said protrusions strengthen said top wall against pressures generated within said chamber.

20. The inflator of claim 16, wherein said exit ports extend through said outer wall.

21. The inflator of claim 20, wherein said protrusions strengthen said top wall against pressures generated within said chamber.

22. The inflator of claim 16, wherein said outer diameter of said filter is less than that of said outer wall to define an annular void therebetween, and wherein at least one said plenum chamber communicates with said void.

23. The inflator of claim 22, wherein said exit ports extend through said outer wall.

24. The inflator of claim 23, wherein said protrusions strengthen said top wall against pressures generated within said chamber.

25. The inflator of claim 24, wherein said housing further includes a tubular inner wall concentrically mounted between said top and bottom walls and interior of said outer wall, and said filter is annular with an inner diameter receiving said inner wall, and wherein said inflator further includes a second one of said seals, said presser foot of said second seal abutting against said filter in proximity to said inner diameter, and said free end of said engagement leg abutting said inner wall.

26. A gas filter for an air bag inflator having a housing with a plurality of walls, said filter comprising:

a monolithic rigid reticulated member having a face, said face including a plurality of protrusions defined by intermediate grooves and depressions, said protrusions being constructed and arranged to be closely received against one of the housing walls, with at least a portion of said grooves and depressions being in communication to define at least one plenum chamber between said filter and the wall when received thereagainst.

27. The filter of claim 26, wherein said filter is substantially planar with an outer diameter, and wherein said protrusions are formed on a longitudinal face.

28. The filter of claim 27, wherein said filter and said protrusions are annular.

29. The filter of claim 27, wherein said outer diameter is sized to be spaced from a concentric one of the housing walls to define an annular void area therebetween, and wherein at least one said plenum chamber opens onto said outer diameter to provide communication between said plenum chamber and said void area.

30. The filter of claim 26, wherein said filter is substantially tubular with an outer diameter, and wherein said protrusions are formed on an outer circumferential face.

31. A gas filter for an air bag inflator having a housing with circular top and bottom walls and a tubular outer wall extending therebetween, said filter comprising:

a monolithic rigid reticulated member, said member being substantially tubular with an outer diameter constructed and arranged to be received concentrically within said outer wall, said outer diameter being less than a diameter of said outer wall to form an annular plenum chamber between said filter and said outer wall.

32. In an air bag inflator housing having a plurality of exit ports, the improvement comprising:

a top wall having a circular periphery and an interior face constructed and arranged to be in proximity to a gas filter, said face including a plurality of protrusions extending therefrom, said protrusions strengthening said top wall against pressures generated within said housing, said protrusions constructed and arranged to abut against the gas filter and defining therebetween, with the filter, at least one plenum chamber, at least one said plenum chamber being in communication with each of said exit ports.

33. In an air bag inflator having a ignition chamber surrounded by a tubular wall, with a gas generant exterior of said wall, and a plurality of ignition ports extending through said wall and each having a longitudinal axis which may be projected upon a plane normal to said tubular wall to define a projected axis, the improvement comprising:

at least one of said ports having a projected axis which forms an angle with a radial line passing through said axis at the interior face of said tubular wall.

34. The improvement of claim 33, wherein all of said ports have a projected axis which forms an angle with a radial line passing through associated ones of said axes at the interior face of said tubular wall.

35. The improvement of claim 34, wherein said angles are swept in the same direction.

36. The improvement of claim 35, wherein said angle is substantially 90°.

* * * * *

UNITED STATES PATENT AND TRADEMARK OFFICE
CERTIFICATE OF CORRECTION

PATENT NO. : 5,564,741
DATED : 15 October 1996
INVENTOR(S) : Alan J. Ward et al.

It is certified that error appears in the above-indentified patent and that said Letters Patent is hereby corrected as shown below:

column 3, line 52, "to the a fourth embodiment" should be --to the fourth embodiment--.

column 8, line 27, "56 could be provide with" should be --56 could be provided with--.

column 9, line 63, "it may bee seen" should be --it may be seen--.

column 18, line 35, "having a ignition chamber" should be --having an ignition chamber--.

Signed and Sealed this

Ninth Day of September, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,564,741

DATED : October 15, 1996

INVENTOR(S) : Alan J. Ward et al.

It is certified that error appears in the above-indentified patent and that said Letters Patent is hereby corrected as shown below:

At title page, under Inventors, "Harry M. Miller" should be
--Harry W. Miller--.

At column 2, line 18, "the filter ends" should be
--the filter's ends--.

At column 2, lines 38 and 39, "such seal arrangement" should be
--such an seal arrangement--.

Signed and Sealed this

Twenty-eighth Day of October, 1997

Attest:

BRUCE LEHMAN

Attesting Officer

Commissioner of Patents and Trademarks